A. M. Damon.

Dressing Warp for Looms.

No. 2,526. Reissued Mar. 26, 1867.

Witnesses.
Geo. Andrews
Chas. A. Pfister

Inventor.
Alex. M. Damon
by his attorney
R. H. Eddy

N. PETERS, PHOTO-LITHOGRAPHER, WASHINGTON, D. C.

BEST AVAILABLE COPY

United States Patent Office.

ALEXANDER M. DAMON, OF LOWELL, MASSACHUSETTS.

*Letters Patent No.* 58,611, *dated October* 9, 1866; *reissue No.* 2,526, *dated March* 26, 1867.

IMPROVEMENT IN WARP-DRESSING FRAMES.

The Schedule referred to in these Letters Patent and making part of the same.

TO ALL PERSONS TO WHOM THESE PRESENTS SHALL COME:

Be it known that I, ALEXANDER M. DAMON, of Lowell, in the county of Middlesex, and State of Massachusetts, have made a new and useful invention having reference to Machinery for Sizing or Dressing Warps; and I do hereby declare the following to be a description of the same, reference being had to the accompanying drawings, which are to be considered a part of my specification. In such drawings—

Figure 1:
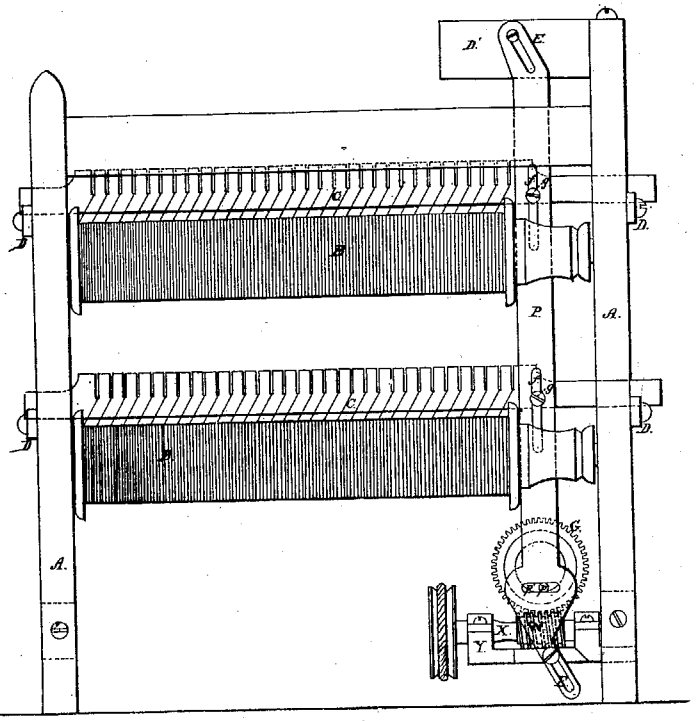

Figure 1 represents a front elevation; and

Figure 2:
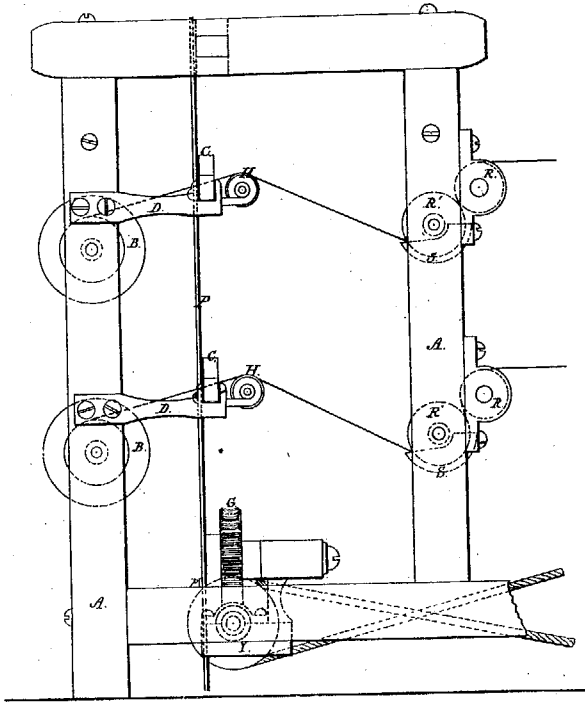

Figure 2 a side elevation of a machine containing or constituting my invention.

Similar letters indicate like parts in the several figures.

In dressing the warp for looms, the threads thereof are usually passed over and between rollers, and also into a trough or size-box, or, instead of going through the size-box, they are sometimes run over and against the roller thereof. During this operation the curved surface of each of the rollers becomes more or less covered with the sizing, which is liable to harden thereon in the spaces between the threads on the rollers, and requires frequently to be cleaned off. This process subjects the roller or its cloth covering to much extra wear, and in scraping or cleaning the covering it is liable to become uneven on the roller. The object of my invention is to obviate this difficulty, and such invention may be said to consist in providing the sizing machine or dresser-frame with a means or mechanism for changing the position of the threads on the rollers while the former may be passing over the latter in the process of sizing such threads. In carrying out my invention I connect a slotted bar to each of the raddles or thread-guides in such a way as to cause it, when moved, as hereinafter explained, by mechanism to be described, to impart to each of the raddles a reciprocating motion to and fro, such being while the threads are being run from the section beams to the centre beam.

In the drawings, A represents the frame, or a portion of the frame, of the machine; B B the section beams, from which the threads are unwound while passing to the sizing-box, or the roller thereof. Extending to the rear from the sides of the front uprights of the frame are arms D D, (fig. 2,) which serve to so support the raddles or thread-guides C C as to allow them to be slid freely longitudinally in notches or slots made in the said arms D D, there being two of such supports to each of the raddles. At the lower part of the frame A a worm gear, G, is arranged. It engages with a worm or screw affixed on a shaft, X, provided with means for imparting to it a rotative motion. P denotes a flat bar of metal, having an oblique termination or arm, E, at its upper as well as at its lower end; such arms being projected from it in opposite directions. Each of these terminations or arms E is slotted; the slot of the upper arm being made to receive a pin projected from or screwed into a part, D′, of the frame A. The lower slot receives a similar pin or screw, attached to a bracket or frame, Y, extending from the lower part of the main frame A, in manner as shown in fig. 1. The slotted portions E of the bar are to be capable of sliding freely on these pins. From each raddle or thread-guide C there projects a screw or headed pin, *g*, which extends within an elongated slot, *f*, made in the bar P, as seen in fig. 1. Near the lower part of the bar P is a horizontal slot, *p′*, into which a screw or headed pin, *p*, attached to the gear-wheel G, extends. During each revolution of the said gear the bar P will receive a reciprocating motion up and down. The slots in the oblique portions of the bar, at the same time, will cause such bar to move in oblique directions, so as to impart to the raddles or thread-guides reciprocating motions. R′ R′ represent the sizing-rollers, either or each of which may be provided with some suitable covering. R R are squeeze-rollers, there being one of them to each of the sizing-rollers. S S represent troughs in which the sizing is held, the rollers R′ R′ being exhibited under the troughs. Through and into the troughs, or over and against their rollers, the threads while being sized are made to pass, and from these they pass over the squeeze-rollers R R, and thence to the centre beam or beams.

In warp-dressing machines, as heretofore commonly made, each of the threads passes directly from the raddle to the rollers, and runs in one path continually on the same. In this way the sizing is liable to become dried in the spaces or parts of the rollers which are between the paths of the threads, such requiring frequent scraping or cleaning of the surface or surfaces of the covering of the rollers in order to remove the sizing therefrom. This process of cleaning the roller increases the wear of its covering and is liable to make an uneven surface thereon. The reciprocating motion of the raddles in my invention, as above explained, causes the threads, as they pass over or under the covered sizing-rollers, to continually change their positions thereon, and thus insures an even distribution of the sizing thereupon and causes them to run more dryly, and consequently, as has been found, increases the number of cuts in a given time, and saves the labor of one person required to effect the scraping of the rollers. The bar P may be made of sufficient length to put in motion a series of raddles.

Having thus described my invention, what I claim, and desire to secure by Letters Patent, is is as follows, that is to say—

I claim the combination or mechanism for operating one or more raddles, in manner as set forth, such consisting of the slotted bar P, the gear G, the pins *g p*, and mechanism for revolving the said gear; the said bar P being constructed, and the whole being arranged together, and with the raddle or raddles, substantially as and so as to operate as hereinbefore explained.

ALEXANDER M. DAMON.

Witnesses:

S. G. LYFORD,

J. B. LYALL.